Patented Jan. 21, 1947

2,414,585

UNITED STATES PATENT OFFICE 2,414,585

CATALYTIC DEHYDROGENATION

Frank T. Eggertsen, Oakland, and Hervey H. Voge, Berkeley, Calif., assignors to Shell Development Company, San Francisco, Calif., a corporation of Delaware No Drawing. Application June 26, 1945, Serial No. 601,708

9 Claims. (Cl. 260—669)

This invention relates to dehydrogenation at high temperatures in the presence of steam with special catalysts which allow substantially continuous operation over long periods of time. Particular aspects of the invention relate to the catalytic dehydrogenation of olefinic compounds and alkyl aromatic compounds at temperatures above about 580° C. in the presence of predominating amounts of steam with new and improved catalysts consisting predominantly of potassium carbonate and magnetic oxide of iron.

In view of the importance of catalytic dehydrogenation a great deal of work has been done in attempts to improve this process for special applications, particularly by discovering new and improved contact agents. As a result of this work a large number of materials have been found which are capable of catalyzing dehydrogenation to a greater or lesser extent and which conceivably could be employed in practice to effect dehydrogenation. Also a vast array of combinations or composites of two, three, or more of such materials either alone or with other materials have been tested and many of these have been recommended for particular uses. As a result catalytic dehydrogenation processes have come into wide use in various branches of chemical industry.

Although there are notable exceptions, the great majority of contact agents used in such processes contain as the primary active constituent a compound, usually an oxide, of a metal of the fourth, fifth, or sixth group of the periodic system of the elements. These compounds are generally recognized as the most efficient dehydrogenation promoters. These catalysts generally operate at fairly high temperatures and at these temperatures they lose their effectiveness relatively rapidly due to the accumulation of carbonaceous deposits. They therefore generally require intermittent operation with frequent regeneration. This is a big disadvantage and is well recognized as such by the art. There is therefore a demand for catalytic dehydrogenation processes which can be operated substantially continuously.

It was discovered more or less recently that catalytic dehydrogenation can be carried out substantially continuously by employing special catalysts and maintaining a suitable concentration of steam in the reaction zone. A preferred type of catalyst for this type of operation (hereinafter refered to as autoregenerative catalysts) comprises iron oxide which has been alkalized by an alkali such as potassium oxide.

Iron oxide has long been recognized to possess certain catalytic properties. Many catalysts containing iron oxide have been developed for special purposes and some of them are used commercially. However, as will be apparent from the comprehensive and detailed compilation of the catalysts mentioned in the literature and patents relating to dehydrogenation in Berkman, Morrell, and Egloff, "Catalysis," pages 888–906 (1940), iron oxide is recommended as a dehydrogenation catalyst only in a very few special cases. This is due, firstly, to certain undesirable properties of iron oxide catalysts for this purpose and, secondly, to the availability of other more desirable catalysts. The more important, objectionable properties of the hitherto known iron oxide catalysts for dehydrogenation are, firstly, their pronounced tendency to produce large amounts of carbon, and secondly, their relatively short life. The first of these objectionable properties is due to the fact that under the reducing conditions generally prevailing in dehydrogenation, the iron oxide tends to be converted at least in part to a lower oxide or metallic iron which causes decomposition to carbon. The second of these objectionable properties is found to be due to the tendency of the iron oxide to react or combine with many of the catalyst components commonly used therewith. These difficulties are avoided in the autoregenerative catalysts as follows: The tendency of the iron to reduce to a form which causes the decomposition of the reactants to carbon is prevented or counteracted by maintaining in the reaction zone a suitable oxidizing atmosphere. This is obtained by the use of large amounts of steam and usually also by using the catalyst in combination with a difficultly reducible oxide which tends to prevent reduction of the iron oxide. The relatively short catalytic life of the prior-used iron oxide catalysts is avoided by employing catalysts consisting largely or essentially of iron oxide and avoiding as far as possible the use of materials with which the iron oxide tends to react to form inactive compounds. The cyclic or intermittent method of operation is avoided by promoting the catalyst in such a manner that it is continuously regenerated with the steam. Poisoning of the catalyst by the large amounts of steam employed is prevented by promoting the catalyst and by operating at temperatures above about 580° C.

The iron oxide only becomes suitable for promoting dehydrogenation under autoregenerative conditions when combined with suitable concentrations of a compound of an alkali metal. Preferred alkali metal compounds are the compounds of potassium, rubidium, and caesium. Compounds of sodium and lithium give relatively inferior catalysts, but may be advantageously used in conjunction with compounds of potassium, rubidium, or caesium. Oxides of calcium, strontium, and barium exert a somewhat similar effect and may if desired be substituted in part for the alkali metal compound. The alkali is a promoter and is used only in small amounts. The amount of alkali used in the catalyst is in general between about 0.5 and 5 mol percent (calculated as the oxide) based on the iron oxide (calculated as $Fe_2O_3$). Large amounts decrease the activity of the catalyst.

As pointed out above the alkalized iron oxide is in many cases further stabilized by the presence of a more difficultly reducible metal oxide which tends to prevent the reduction of the iron oxide. Preferred materials for the purpose are the oxides of Cr, Mn, Bi, Al, Mg, Be and Ce. These materials, if used, are used only in minor proportions. Also the catalysts may be improved for some dehydrogenation reactions by the incorporation of a small amount of a promoter, such in particular as an oxide of copper or silver. The catalysts may also in some cases contain minor amounts of inert fillers, extenders, or binding materials. However, as pointed out above, it is desired to avoid as far as possible the inclusion of materials which react with the iron oxide to form inactive compounds and for this reason such materials as alumina and magnesia if used at all are used only in minor concentrations.

In addition to the composition of the autoregenerative catalysts the method of preparation is of importance. These catalysts have a considerable tendency to oxidize the reactants to carbon dioxide as well as to dehydrogenate them. When these catalysts are prepared in the usual manner as, for example, by co-precipitation or by simply mixing the oxides and pelleting they have a considerable oxidizing activity and consequently the yields of dehydrogenated product are usually too low to make their use practicable. Furthermore the catalyst pellets are weak and easily broken up. These difficulties are overcome by subjecting the catalyst before use to a drastic heat treatment. It is found that by subjecting the catalyst to a suitable heat treatment the oxidizing activity of the catalyst can be substantially reduced with only a minor depreciation of the dehydrogenating activity. Also the heat treatment results in a material strengthening of the catalyst particles. The heat treatment must, of course, be carried out under carefully controlled conditions since an insufficient treatment leaves an excessive oxidizing activity and a too drastic treatment destroys the dehydrogenation activity as well as the oxidizing activity. The heat treatment is above about 800° C. and usually between about 900° C. and 950° C. for a period of about 3 hours.

These above-described autoregenerative catalysts when used for dehydrogenation at temperatures above about 580° C. and in the presence of steam allow the dehydrogenation to be carried out quite selectively and substantially continuously over fairly long periods of time without regeneration.

A typical example of such a catalyst is a catalyst (of the type known in the art as "105 Catalyst") prepared by mixing about 93 parts of a powdered iron oxide ($Fe_2O_3$) and about 5 parts of powdered chromium oxide ($Cr_2O_3$) with an aqueous solution of potassium carbonate containing about 2 parts potassium hydroxide to form a paste which is extruded, dried and finally calcined at a temperature of about 930° C. for about 3 hours. This particular type of catalyst finds application in the dehydrogenation of butylene to butadiene and the dehydrogenation of ethyl benzene to styrene under the following approximate conditions:

Temperature _____ 580–650° C.
Pressure _____ 0–30 p. s. i. g.
Gaseous hourly space velocity_____ 300–1000
Steam/hydrocarbon mol ratio_____ 7:1–20:1

Under these conditions the process is carried out for at least 1000 hours without regeneration.

As pointed out above, the calcination of the hitherto known autoregenerative catalysts of this type is essential in practice to bring the oxidizing activity of the catalyst within acceptable limits. This calcination also results in some loss of dehydrogenation activity. This loss of dehydrogenation activity upon calcination is found to be more or less dependent on the potassium content of the catalyst, and is especially marked at very high or very low potassium contents. This is another reason why the potassium concentration in the hitherto known catalysts of this type is maintained in a median range usually below about 5 mol percent (calculated as $K_2O$).

Superior catalysts of the described type suitable for use in dehydrogenation under autoregenerative conditions have now been discovered. The catalysts of the present invention differ from the above described catalysts both in composition and in method of preparation. It has now been found that by materially increasing the proportion of alkali above that hitherto employed and by suitably heat treating the iron oxide prior to combining it with the alkali, catalysts result which have the desired selectivity for the dehydrogenation and in addition are operable with lower concentrations of steam and have a higher dehydrogenation activity and longer useful life.

According to the present invention the catalyst is prepared with a precalcined iron oxide and is not subjected to any further calcination treatment which involves temperature above about 800° C. When the iron oxide is heated alone, temperatures as low as 700° C. can sometimes be employed for the precalcination. Preferred temperatures are in the order of 800–950° C. However, other catalyst components such in particular as a minor amount of the more difficultly reducible oxide stabilizer may be incorporated prior to the heat treatment. In such cases somewhat higher calcination temperatures in the range of 850° C.–1050° C. are usually required. When heated at such temperatures the iron oxide undergoes an appreciable decrease in specific surface (measured by low temperature nitrogen adsorption or by oil adsorption), the crystallites of iron oxide increase in size, and the iron oxide may also increase in bulk density (i. e. the weight of a given volume of the material).

A suitable iron oxide may be prepared for example, by calcining a precipitated iron oxide in the form of a powder at a temperature between about 800° C. and 875° C. for about 30 minutes until it has a surface area below 8 square meters per gram and preferably about 4 square meters per gram. Such a precalcined iron oxide powder weighs for example about 250 pounds per barrel. In general the iron oxide after the precalcination will be in the form of a brownish-red $Fe_2O_3$. However, if desired the calcination may be carried out under reducing conditions such that the precalcined iron oxide is partly or completely in the form of black $Fe_3O_4$.

After the precalcination of the iron oxide the remaining catalyst ingredients may be incorporated as by simply mixing the powders or by impregnating the iron oxide powder with suitable solutions. For example, a minor amount of chromium oxide powder or one of the above mentioned difficultly reducible metal oxides may be mixed with the precalcined iron oxide and then the mixture formed into a slurry with an aqueous solution of a potassium salt. The amount of potassium incorporated in the catalyst according to the present invention is at least 25 mol percent (calculated as $K_2O$) and preferably in the order of 33–100 mol percent based on the iron oxide (calculated as $Fe_2O_3$). Thus, the composite, in the absence of third components, contains at least about 20 mol percent of potassium and preferably contains in the order of 25–50 mol percent potassium, (calculated as $K_2O$), the remainder being iron oxide (calculated as $Fe_2O_3$). The potassium may in fact be in molecular excess with respect to the iron.

The potassium may be incorporated in the form of any potassium compound which is convertible to potassium carbonate upon contact with carbon dioxide under the conditions of use. Thus, for example, the potassium may be introduced in the form of potassium hydroxide, potassium nitrate, potassium bicarbonate, potassium sulfate, potassium acetate, etc., as well as in the form of potassium carbonate. In most cases where the iron oxide is in the form of $Fe_2O_3$, the composite is preferably partially reduced prior to use to convert the $Fe_2O_3$ into $Fe_3O_4$, and if the potassium is added in the form of some other compound than potassium carbonte, it is desirable to convert it to potassium carbonate. A suitable pre-reduction treatment is, for example, to treat the catalyst with a mixture of steam, hydrogen and carbon dioxide at a temperature between about 300° C. and 700° C. for a short time. Such pre-reduction, although desirable, is not essential since the catalyst becomes reduced during use.

As just pointed out, the catalyst, if it is prepared from $Fe_2O_3$ and is not reduced by a pretreatment, becomes reduced during its use in effecting the dehydrogenation. This reduction usually takes place during the first few minutes of use, but in some cases may require several hours to come to equilibrium. During use (or pretreatment) other changes may also take place in the catalyst. It will be appreciated that the phase relationships in the systems in question are complicated and little known. It will also be appreciated that it is difficult to determine conclusively the exact state of the various catalyst components in the catalyst under the conditions of use. For these reasons the invention is not to be made dependent upon the correctness of the evident composition and physical make-up of the final catalyst. It has been determined, however, that the finished catalyst (as in use) is dark, has a high magnetic susceptibilty, and shows the X-ray diffraction pattern of $Fe_3O_4$. Since furthermore gamma $Fe_2O_3$ and metallic iron are unstable under the reaction conditions, it is evident beyond any reasonable doubt that the iron in the catalyst is essentially in the form of ferroso ferric oxide ($Fe_3O_4$). This is also indicated by analysis of the catalyst. Also, analysis of the catalyst shows that potassium and carbonate are present in the stoichiometric quantities corresponding closely to $K_2CO_3$. (This condition is established regardless of any pretreatment due to the invariable presence of a small amount of carbon dioxide formed in the dehydrogenation process.) Thus, according to analysis and evident physical properties the iron and potassium exist in the catalyst essentially as ferroso ferric oxide and potassium carbonate, respectively. Third components in the catalyst, if present, are probably present either as discrete particles or in solid solution.

The process of the invention as described above is carried out under autoregenerative conditions, i. e. at temperatures above about 580° C. and generally below about 700° C., in the presence of a predominating molecular amount of steam, under which conditions the dehydrogenation may be carried out substantially continuously over long periods of time. It may be carried out at any desired pressure in any desired type of reaction system and is of general application where autoregenerative dehydrogenation can be applied. It is particularly advantageous for the catalytic dehydrogenation of materials of an olefinic nature such as alkenes, alkadienes, alkynes, cyclenes, aromatics and their substitution products. Particular applications of autoregenerative dehydrogenation, as pointed out above, are the dehydrogenation of butylene to butadiene and the dehydrogenation of ethyl benzene to styrene.

The catalysts are adversely affected by halides, and halides are therefore excluded as far as possible.

*Example*

Precipitated ferric hydrate was calcined at a temperature between about 800° C. and 875° C. for about 30 minutes. The precalcined iron oxide was then passed through a pulverizer to break up the aggregates and classified with air to separate the powder passing a 325 mesh sieve. This precalcined iron oxide had the following properties:

Average particle size. About 0.5–0.8 micron
Specific surface_____ 4.1 m.²/g.
Color_____ Brownish red (5R 4/6 on Munsell color chart)

271 parts of this precalcined iron oxide powder was mixed with 9 parts of chromium oxide powder and 115 parts of anhydrous powdered potassium carbonate. This mixture was moistened with a solution of 1 part of tannic acid and 42 parts of potassium carbonate in 38 parts of water. The moist powder was "slugged" in a ¼" punch and die, crushed to less than 20 mesh, and then finally formed into 3/16" pellets using a Stokes pelleting machine. The pellets, after drying at 160° C.–170° C. for several hours, were ready for use. The pellets without any further calcination had a bulk density of about 1.35 g./cc. and a crushing strength of about 20 lbs.

This catalyst was used for the dehydrogenation of butylene to butadiene under the following conditions:

Temperature _____ 620° C.
Pressure _____ Atmospheric
Gaseous hourly space velocity____ 300
Mol ratio of steam to butylene____ 12

After an initial induction period of about three hours, the catalyst came to a steady state and operated continuously at a steady conversion of butylene to butadiene of about 23% with normal efficiency.

A catalyst containing the same high concentration of potassium carbonate, but calcined above 800° C. in the usual manner, on the other hand, gives a conversion of butylene to butadiene of only about 17% under the same conditions.

We claim as our invention:

1. In a process for effecting continuous dehydrogenation of a hydrocarbon in the presence of steam at a temperature between about 580° C. and 700° C., the improvement which comprises effecting the dehydrogenation with a catalyst consisting predominantly of magnetic oxide of iron and potassium carbonate prepared by combining a powdered iron oxide which has been calcined at a temperature in the order of 700° C. to 950° C. for a time to reduce the available surface to below 8 square meters per gram with from between 25 and 100 mol percent (calculated as $K_2O$ and based on the iron oxide calculated as $Fe_2O_3$) of a compound of potassium convertible to potassium carbonate under the reaction conditions, forming the mixture into pellets, and hardening the pellets by heating at an elevated temperature below about 800° C.

2. In a process for effecting continuous dehydrogenation of a hydrocarbon in the presence of steam at a temperature between about 580° C. and 700° C., the improvement which comprises effecting the dehydrogenation with a catalyst consisting predominantly of magnetic oxide of iron and potassium carbonate prepared by combining a powdered iron oxide which has been calcined at a temperature in the order of 700° C. to 950° C. for a time to reduce the available surface to below 8 square meters per gram with a minor amount of a more difficulty reducible metal oxide and from 25 to 100 mol per cent (calculated as $K_2O$ and based on the iron oxide calculated as $Fe_2O_3$) of a compound of potassium convertible to potassium carbonate under the reaction conditions, forming the mixture into pellets, and hardening the pellets by heating at an elevated temperature below about 800° C.

3. In a process for effecting continuous dehydrogenation of a hydrocarbon in the presence of steam at a temperature between about 580° C. and 700° C., the improvement which comprises effecting the dehydrogenation with a catalyst consisting predominantly of magnetic oxide of iron and potassium carbonate prepared by combining a powdered iron oxide which has been calcined at a temperature in the order of 700° C. to 950° C. for a time to reduce the available surface to below 8 square meters per gram with a minor amount of chromium oxide powder and from between 25 and 100 mol per cent (calculated as $K_2O$ and based on the iron oxide calculated as $Fe_2O_3$) of a compound of potassium convertible to potassium carbonate under the reaction conditions, forming the mixture into pellets, and hardening the pellets by heating at an elevated temperature below about 800° C.

4. In a process for effecting continuous dehydrogenation of a hydrocarbon in the presence of steam at a temperature between about 580° C. and 700° C., the improvement which comprises effecting the dehydrogenation with a catalyst consisting predominantly of magnetic oxide of iron and potassium carbonate prepared by combining a powdered iron oxide which has been calcined at a temperature in the order of 700° to 950° C. for a time to reduce the available surface to below 8 square meters per grame with from 25 to 100 mol per cent (calculated as $K_2O$ and based on the iron oxide calculated as $Fe_2O_3$) of potassium carbonate, forming the mixture into pellets, and hardening the pellets by heating at an elevated temperature below about 800° C.

5. In a process for effecting continuous dehydrogenation of a hydrocarbon in the presence of steam at a temperature between about 580° C. and 700° C., the improvement which comprises effecting the dehydrogenation with a catalyst consisting predominantly of magnetic oxide of iron and potassium carbonate prepared by combining a powdered iron oxide which has been calcined at a temperature in the order of 700° C. to 950° C. for a time to reduce the available surface to about 4 square meters per gram with from between 25 and 100 mol per cent (calculated as $K_2O$ and based on the iron oxide calculated as $Fe_2O_3$) of a compound of potassium convertible to potassium carbonate under the reaction conditions, forming the mixture into pellets, and hardening the pellets by heating at an elevated temperature below about 800° C.

6. In a process for effecting continuous dehydrogenation of an olefin in the presence of steam at a temperature between about 580° C. and 700° C., the improvement which comprises effecting the dehydrogenation with a catalyst consisting predominantly of magnetic oxide of iron and potassium carbonate prepared by combining a powdered iron oxide which has been calcined at a temperature in the order of 700° C. to 950° C. for a time to reduce the available surface to below 8 square meters per gram with from between 25 and 100 mol per cent (calculated as $K_2O$ and based on the iron oxide calculated as $Fe_2O_3$) of a compound of potassium convertible to potassium carbonate under the reaction conditions, forming the mixture into pellets, and hardening the pellets by heating at an elevated temperature below about 800° C.

7. In a process for effecting continuous dehydrogenation of butylene to butadiene in the presence of steam at a temperature between about 580° C. and 700° C., the improvement which comprises effecting the dehydrogenation with a catalyst consisting predominantly of magnetic oxide of iron and potassium carbonate prepared by combining a powdered iron oxide which has been calcined at a temperature in the order of 700° C. to 950° C. for a time to reduce the available surface to below 8 square meters per gram with from between 25 and 100 mol per cent (calculated as $K_2O$ and based on the iron oxide calculated as $Fe_2O_3$) of a compound of potassium convertible to potassium carbonate under the reaction conditions, forming the mixture into pellets, and hardening the pellets by heating at an elevated temperature below about 800° C.

8. In a process for effecting continuous dehydrogenation of ethyl benzene to styrene in the presence of steam at a temperature between about 580° C. and 700° C., the improvement which comprises effecting the dehydrogenation with a catalyst consisting predominantly of magnetic oxide of iron and potassium carbonate prepared by combining a powdered iron oxide which has been calcined at a temperature in the order of 700° C. to 950° C. for a time to reduce the available surface to below 8 square meters per gram with from between 25 and 100 mol per cent (calculated as $K_2O$ and based on the iron oxide calculated as $Fe_2O_3$) of a compound of potassium convertible to potassium carbonate under the reaction conditions, forming the mixture into pellets, and hardening the pellets by heating at an elevated temperature below about 800° C.

9. In a process for effecting continuous dehydrogenation of butylene to butadiene in the presence of steam at a temperature between about 580° C. and 700° C., the improvement which comprises effecting the dehydrogenation with a catalyst consisting predominantly of magnetic oxide and iron and potassium carbonate prepared by combining a powdered iron oxide which has been calcined at a temperature in the order of 800° C. to 950° C. for a time to reduce the available surface to about four square meters per gram with between 33 and 100 mol percent (calculated as $K_2O$ and based on the iron oxide calculated as $Fe_2O_3$) of a compound of potassium convertible to potassium carbonate under reaction conditions, forming the mixture into pellets and hardening the pellets by heating at an elevated temperature below about 800° C.

FRANK T. EGGERTSEN.
HERVEY H. VOGE.